(12) United States Patent
Eckert et al.

(10) Patent No.: US 8,197,108 B2
(45) Date of Patent: Jun. 12, 2012

(54) BUMPER ARRANGEMENT IN OR FOR A MOTOR VEHICLE

(75) Inventors: Heiko Eckert, Bingen-Büdesheim (DE); Thomas Feid, Mannheim (DE); Martin Likar, Rüsselsheim (DE); Ingolf Schneider, Rüsselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 279 days.

(21) Appl. No.: 12/301,750

(22) PCT Filed: May 15, 2007

(86) PCT No.: PCT/EP2007/054695
§ 371 (c)(1),
(2), (4) Date: May 15, 2009

(87) PCT Pub. No.: WO2007/135023
PCT Pub. Date: Nov. 29, 2007

(65) Prior Publication Data
US 2009/0315345 A1 Dec. 24, 2009

(30) Foreign Application Priority Data
May 20, 2006 (DE) .......... 10 2006 023 803

(51) Int. Cl.
*B60Q 1/00* (2006.01)

(52) U.S. Cl. ........ 362/505; 362/369; 362/390; 362/549; 293/117; 296/187.09; 296/193.09; 296/203.02

(58) Field of Classification Search .......... 293/117; 362/369, 390, 505, 507, 549; 296/203.02, 296/187.09, 193.09
See application file for complete search history.

(56) References Cited

U.S. PATENT DOCUMENTS

| 1,905,730 | A | 5/1877 | Gerard et al. |
| 3,869,165 | A * | 3/1975 | Miller ............ 293/121 |
| 5,921,672 | A | 7/1999 | Dobler et al. |
| 6,523,886 | B2 | 2/2003 | Hoffner |
| 7,273,246 | B2 | 9/2007 | Wada |
| 7,338,192 | B2 | 3/2008 | Kreutzberg |

FOREIGN PATENT DOCUMENTS

| DE | 4133002 C3 | 4/1993 |
| DE | 19851491 A1 | 5/2000 |

(Continued)

OTHER PUBLICATIONS

British Patent Office, British Examination Report for Application No. 0821059.3, dated Sep. 6, 2010.

(Continued)

*Primary Examiner* — Stephen F Husar
(74) *Attorney, Agent, or Firm* — Ingrassia Fisher & Lorenz, P.C.

(57) ABSTRACT

A bumper arrangement in or for a vehicle is provided that includes, but is not limited to a bumper, comprising at least one headlamp housing disposed at least partially in the bumper, that includes, but is not limited to a device for positioning the headlamp housing relative to the bumper, having a first receiving means, at which the bumper is attached, a first engagement means, which is firmly connected to the first receiving means, and the first engagement means is displaceably in engagement with the headlamp housing along an x axis, wherein the first engagement means has a fixed distance to the first receiving means along the z axis substantially perpendicularly to the x axis.

8 Claims, 5 Drawing Sheets

FOREIGN PATENT DOCUMENTS

| | | | |
|---|---|---|---|
| DE | 10228464 | A1 | 1/2004 |
| DE | 10236105 | A1 | 2/2004 |
| DE | 10336362 | A1 | 3/2005 |
| DE | 2004026881 | A1 | 12/2005 |
| DE | 60206672 | T2 | 6/2006 |
| EP | 1577610 | A1 | 9/2005 |
| EP | 1634800 | A1 | 3/2006 |
| EP | 2017123 | A1 | 1/2009 |
| JP | 3208738 | | 9/1991 |
| JP | 10044892 | A | 2/1998 |
| JP | 029343 | A | 1/2002 |
| JP | 322910 | A1 | 11/2004 |
| JP | 349923 | A | 12/2005 |
| WO | 0049333 | A1 | 8/2000 |
| WO | 2005007449 | A1 | 1/2005 |
| WO | 2006000722 | A1 | 1/2006 |

OTHER PUBLICATIONS

British Patent Office, British Examination Report for Application No. 0821059.3, dated Jan. 14, 2011.

* cited by examiner

BUMPER ARRANGEMENT IN OR FOR A MOTOR VEHICLE

CROSS-REFERENCE TO RELATED APPLICATIONS

This application is a U.S. National-Stage entry under 35 U.S.C. §371 based on International Application No. PCT/EP2007/054695, filed May 15, 2007, which was published under PCT Article 21(2) and which claims priority to German Application No. 102006023803.6, filed May 20, 2006, which are all hereby incorporated in their entirety by reference.

TECHNICAL FIELD

The invention relates to a bumper arrangement in or for a vehicle and to a vehicle, which has such a bumper arrangement.

BACKGROUND

Conventional bumper arrangements comprise a bumper and headlamp housing disposed partially in the bumper. Although applicable to any bumper arrangements and associated vehicles, the present invention and the problems forming the basis thereof are explained in detail hereinafter with reference to a bumper arrangement in a front end of a motor vehicle.

Two essential design-technology requirements are imposed on such bumper arrangements:

The first requirement relates to the distance between an edge of the bumper and an edge of the headlamp housing. This distance is designated as seam width and plays an important role for the external appearance of the motor vehicle. Consequently, the maintenance of a constant seam width is an aesthetic and at the same time, critical customer requirement. The bumper is typically constructed of a resilient material and has a very long shape in relation to its cross section. Particularly under the action of vertical vehicle accelerations during driving and the weight force, distortions of the bumper and therefore a disadvantageous variation of the seam width can occur.

A second requirement for such bumper arrangements is that damage to components, especially the headlamp housing, must be prevented in frontal collisions of the vehicle at low speeds. For example, DE 103 36 362 A1 describes a device, which firmly connects a headlamp housing and a bumper to one another. In this arrangement, an impact on the bumper has the result that the device pulls out at its fastening points on the bodywork and the connection of the headlamp housing to the device is damaged. Consequently, during a repair the headlamp housing must be replaced, which incurs high cots.

Against this background, it is at least one object of the present invention to provide an improved bumper arrangement. A further object is to ensure a constant seam width between a bumper and a headlamp housing, whereby any damage to the headlamp housing in the event of an impact of the bumper is prevented. In addition, other objects, desirable features and characteristics will become apparent from the subsequent summary and detailed description, and the appended claims, taken in conjunction with the accompanying drawings and this background.

According to the invention, at least one of these objects, desirable features, and characteristics is achieved by a bumper arrangement in a or for a vehicle, comprising a bumper, comprising at least one headlamp housing disposed at least partially in the bumper, comprising a device for positioning the headlamp housing relative to the bumper, having a first receiving means, at which the bumper is attached, a first engagement means, which is firmly connected to the first receiving means, wherein the first engagement means is displaceably in engagement with the headlamp housing along an x axis, wherein the first engagement means has a fixed distance to the first receiving means along the z axis substantially perpendicularly to the x axis.

Furthermore, a vehicle with bodywork is provided, wherein a bumper arrangement according to the invention is attached to the bodywork.

The present invention therefore has the advantage compared with said known attachments in that the device for positioning the headlamp housing relative to the bumper on the one hand creates a constant distance between the headlamp housing and the bumper, thus ensuring a constant seam width. On the other hand, a movement of the bumper in the longitudinal direction of the vehicle in the event of an impact of the vehicle is rendered possible, so that any damage to the headlamp housing is prevented. This is because the connection between headlamp housing and bumper releases a relative movement in the longitudinal direction of the vehicle and prevents a relative movement in the height direction of the vehicle.

According to a preferred further development of the invention, the X axis is disposed in the longitudinal direction of the vehicle and the Z axis is disposed in the height direction of the vehicle. Since the bumper is typically displaced in the longitudinal direction of the vehicle in the even of a collision of the vehicle, the first engagement means should also be configured as displaceable in this direction. Furthermore, a distance of the headlamp arrangement from the bumper in the height direction of the vehicle is to be preferred since the headlamp housing is usually located at the top in the bumper. A Y axis is disposed transversely to the vehicle.

In this application, "substantially perpendicularly" is to be understood as an angle of 60° to 120°. "X axis in the longitudinal direction" or "Z axis in the vehicle height direction" also comprises a deviation of the axes from the respective vehicle direction in the range of up to 30°, preferably by up to 10°.

In a further preferred embodiment, the bumper arrangement comprises a bumper bracket, which carries the bumper, wherein the device is fastened to the bumper bracket. "Bumper bracket" preferably designates a transverse support in the vehicle front end. In this case, the device is preferably fastened such that the bumper is supported by the device in the Z direction in the area of the join. A constant seam width can thus be achieved. The bumper bracket thereby holds the device. The fastening between bumper bracket and the device is preferably provided such that the fastening is easily detachable along the X axis.

A means provided for the fastening of the device to the bumper bracket has a predetermined breaking point in the event of a loading in the longitudinal direction of the vehicle. A controlled release of the device from the bumper bracket in the event of an impact of the bumper is thereby then achieved. Without such a predetermined breaking point, severe deformation of the device by means of the effect of the bumper thereon and therefore possibly damage to the headlamp housing could occur.

In a preferred embodiment, the bumper has a second engagement means, which is in engagement with the first receiving means of the device. This allows conventional bumpers to engage with the device and therefore enables the bumper to be attached to the device.

A reinforcing part is preferably provided, which is attached to the bumper and which comprises the second engagement means. Executing the second engagement means as a separate part, which supports the bumper in the area of the join below the headlamp housing, has the advantage that a local deformation of the bumper at the position, at which the bumper engages with the device, can be avoided. A constant seam width in the longitudinal direction of the join is thus obtained.

In particular, the second engagement means has a hook-shaped and/or angle-shaped cross-section. Such a configuration of the second engagement means leads to simplified mounting of the bumper on the device, in particular through suspension.

According to a further preferred further development, the device has a first cross-section in the X-Z plane with a first, second, and third section, wherein the second section is disposed between the first and the third section, wherein the second section connects the first and the third section, wherein the first and the third section are offset in opposite directions from the second section. A device thus configured is characterized by easy manufacturability while achieving the desired functionality.

The first section preferably forms the first engagement means and/or the third section forms the first receiving means and/or a fastening section, at which the device is fastened on the bumper bracket. This allows attachment of the bumper and the headlamp housing to the device in a very simple and elegant construction-technology manner. In this case, the bumper and the headlamp housing are preferably supported on the third or first section. Furthermore, during a displacement of the bumper in the longitudinal direction of the vehicle in the event of an impact, one face of the bumper acts on the second section. This then leads to a release of the device from the bumper bracket, whereby the first section allows a displaceable engagement in the longitudinal direction of the vehicle by means of an alignment in the longitudinal direction of the vehicle.

According to a preferred further development of the invention, at least one of the sections has at least one reinforcing rib. The loading capacity of the device is hereby increased, which contributes toward improved support of the headlamp housing in the vehicle height direction and thus ensures constant seam width.

Furthermore, it is preferred that the first receiving means is configured as a projection for suspending the second engagement means. A very simple mounting process can thus be achieved.

According to a preferred embodiment, the first engagement means of the device is configured as a plug element. By this means, a connection between the device and the headlamp housing can be achieved very simply in terms of production technology, which is displaceable in the longitudinal direction of the vehicle and prevents any displacement of the headlamp housing toward the device in the height direction of the vehicle. Furthermore, the plug element can be mounted rapidly.

According to a preferred further development, the headlamp housing has a second receiving means, which is in engagement with the first engagement means. A suitable connection between the headlamp housing and the first engagement means is hereby achieved.

The second receiving means of the headlamp housing is preferably configured as a linear guide, which is displaceably inserted into the first engagement means. Such a connection is favorable in terms of production technology and allows the relative movement in the longitudinal direction of the vehicle between the headlamp housing and the device. At the same time, the linear guide is preferably substantially aligned in the longitudinal direction of the motor vehicle. This favors stress-free displacement of the device in the linear guide, when the device is displaced in the longitudinal direction of the vehicle by means of the bumper in the event of an impact.

In a preferred further development of the invention, the device comprises a plastic material and/or a glass-fiber-reinforced plastic material. This simplifies the manufacturability of the device and can be achieved cost-effectively, in particular if the device is manufactured by means of injection molding.

In a further embodiment of the invention, the vehicle front end and/or the vehicle rear end has the bumper arrangement. These areas of the vehicle are frequently exposed to gentle collisions, for example, when parking. It is then particularly advantageous here to provide a bumper arrangement according to the invention, whereby any damage to the headlamps can be prevented in such collisions.

BRIEF DESCRIPTION OF THE DRAWINGS

The present invention will hereinafter be described in conjunction with the following drawing figures, wherein like numerals denote like elements, and:

FIG. 2b shows a more detailed view of the second exemplary embodiment compared with FIG. 2a;

FIG. 2d shows a section from FIG. 2a.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
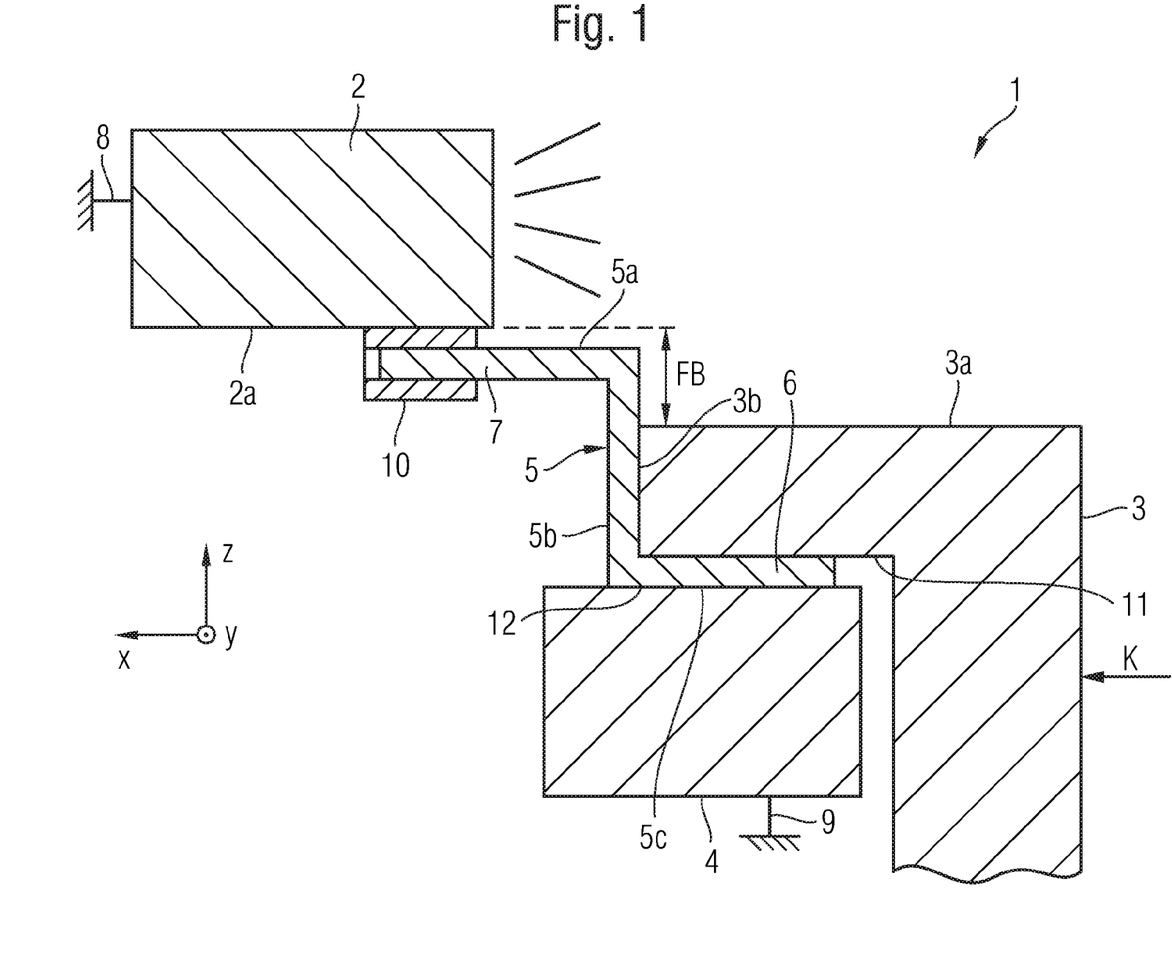
FIG. 1 shows a schematic section of a first exemplary embodiment of a bumper arrangement according to the invention.

FIG. 1 shows a schematic section of a first exemplary embodiment of a bumper arrangement 1 according to the invention. A headlamp housing 2 is disposed with a bumper 3 on a bumper bracket 4 of a vehicle. Both the headlamp housing 2 and the bumper bracket 4 are firmly connected to the bodywork of the vehicle at fastening points 8 or 9.

A device 5 is connected to the bumper bracket 4 at a fastening section 12. The device 5 positions the headlamp housing 2 relative to the bumper 3. By means of the device 5, which carries the bumper 3 and the headlamp housing 2, an upper edge 3a of the bumper 3 and a lower edge 2a of the headlamp housing form a joint running in the Y direction y, having a constant seam width FB.

The device 5 has a first receiving means 6, on which the bumper 3 is attached. Furthermore, the device 5 is provided with a first engagement means 7, which is firmly connected to a first receiving means 6.

Furthermore, the headlamp housing 2 is provided with a second receiving means 10, in which the first engagement means 7 of the device 5 engages. The bumper 3 has a second engagement means 11, which is in engagement with the first engagement means 6.

The first engagement means 7 is in engagement with the headlamp housing 2 displaceably along an X axis x. Furthermore, the first engagement means 7 has a fixed distance from the first receiving means 6 along a Z axis z substantially perpendicularly to the X axis x.

The device 5 has a first cross section in the X-Z plane x, z with a first, second, and third section 5a, 5b, 5c, wherein the second section 5b is disposed between the first and the third section 5a, 5c, wherein the second section 5b connects the first and the third section 5a, 5c, wherein the first and the third section 5a, 5b are offset from the second section 5b in opposite directions along the X axis x.

If, in the event of an impact of the bumper 3, a force K now acts in the longitudinal direction x on, for example, a vehicle while being parked slowly, the bumper 3 vibrates resiliently in the X direction x in the area surrounding the headlamp housing 2.

When the bumper 3 vibrates in the X direction x, it acts at its interfaces 3b on the second section 5b of the device 5. This effects a resilient deformation of the device 5 and/or release of said device from the fastening section 12.

This release of the device 5 at the fastening section 12 can be provided by means of a predetermined breaking point of a fastening means (not shown) or a predetermined breaking point contained in the device 5 itself.

This deformation or this release from the fastening section effects a displacement of the first engagement means 7 in the X direction x relative to the headlamp housing 2. The first engagement means 7 is thereby merely displaced in the second receiving means 10 in the X direction x. Consequently, no damage occurs to the headlamp housing 2 or the second receiving means 10.

The second exemplary embodiment will be described hereinafter, which is substantially based on the first exemplary embodiment.

Figure 2A:
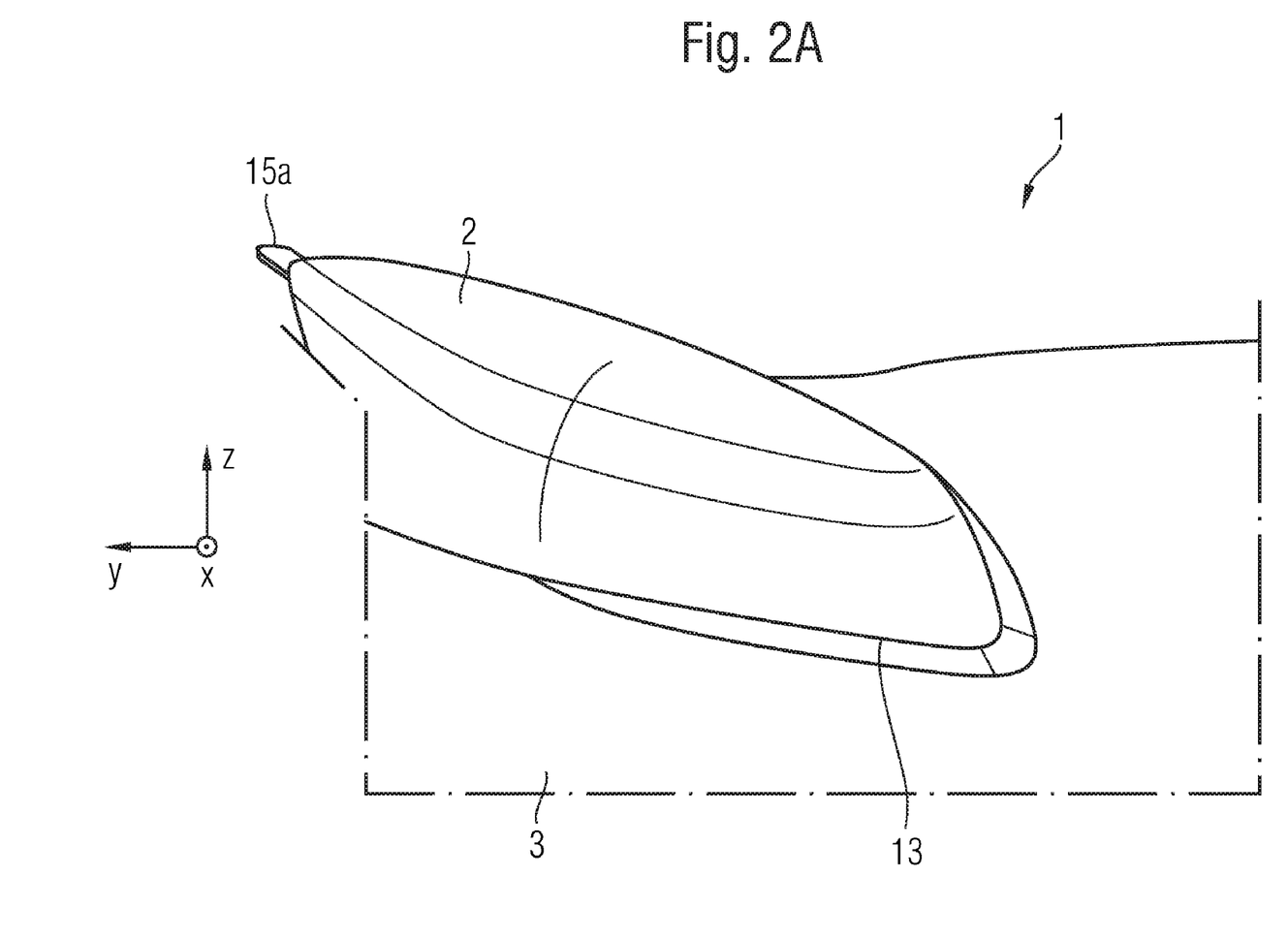
FIG. 2a shows a front view of a second exemplary embodiment of a bumper arrangement according to the invention.

FIG. 2a shows a front view of a second exemplary embodiment of a bumper arrangement 1 according to the invention. The headlamp housing 2 is disposed partially inside the bumper 3. The bumper arrangement 1 has a join 13 between the headlamp housing 2 and the bumper 3.

Figure 2B:
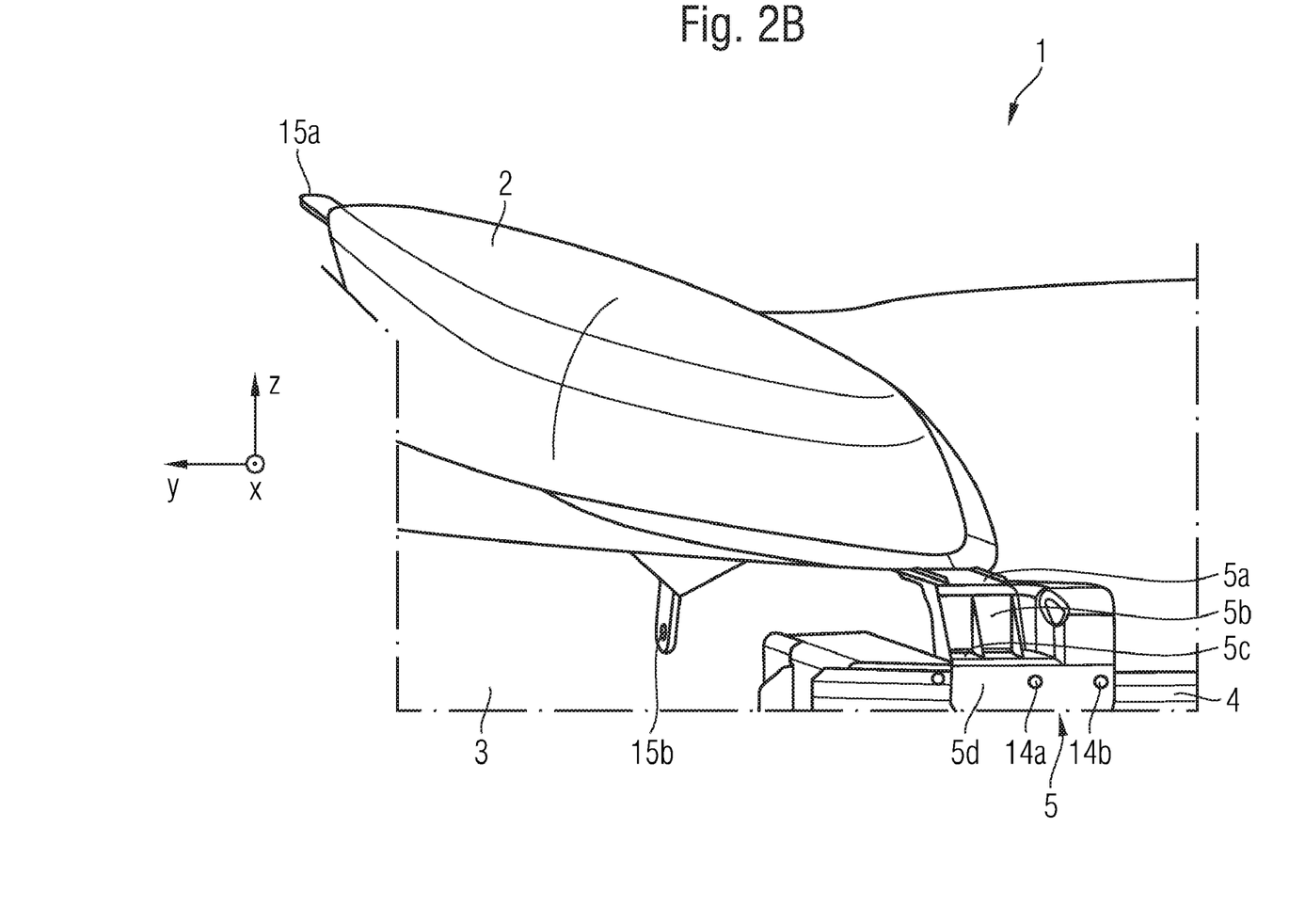

FIG. 2b shows a more detailed view from FIG. 2a. Unlike FIG. 2a, FIG. 2b shows the device 5 as well as the bumper bracket 4, to which the device 5 is screwed. The fastening section 12 has another angled section 5d substantially at right angles to the third section 5c. The device 5, preferably the fastening section 12, has two fastening holes 14a, 14b for fastening the device 5 to the bumper bracket 4. The headlamp housing 2 is fastened to parts of the vehicle bodywork (not shown) by means of lugs 15a, 15b.

Figure 2C:
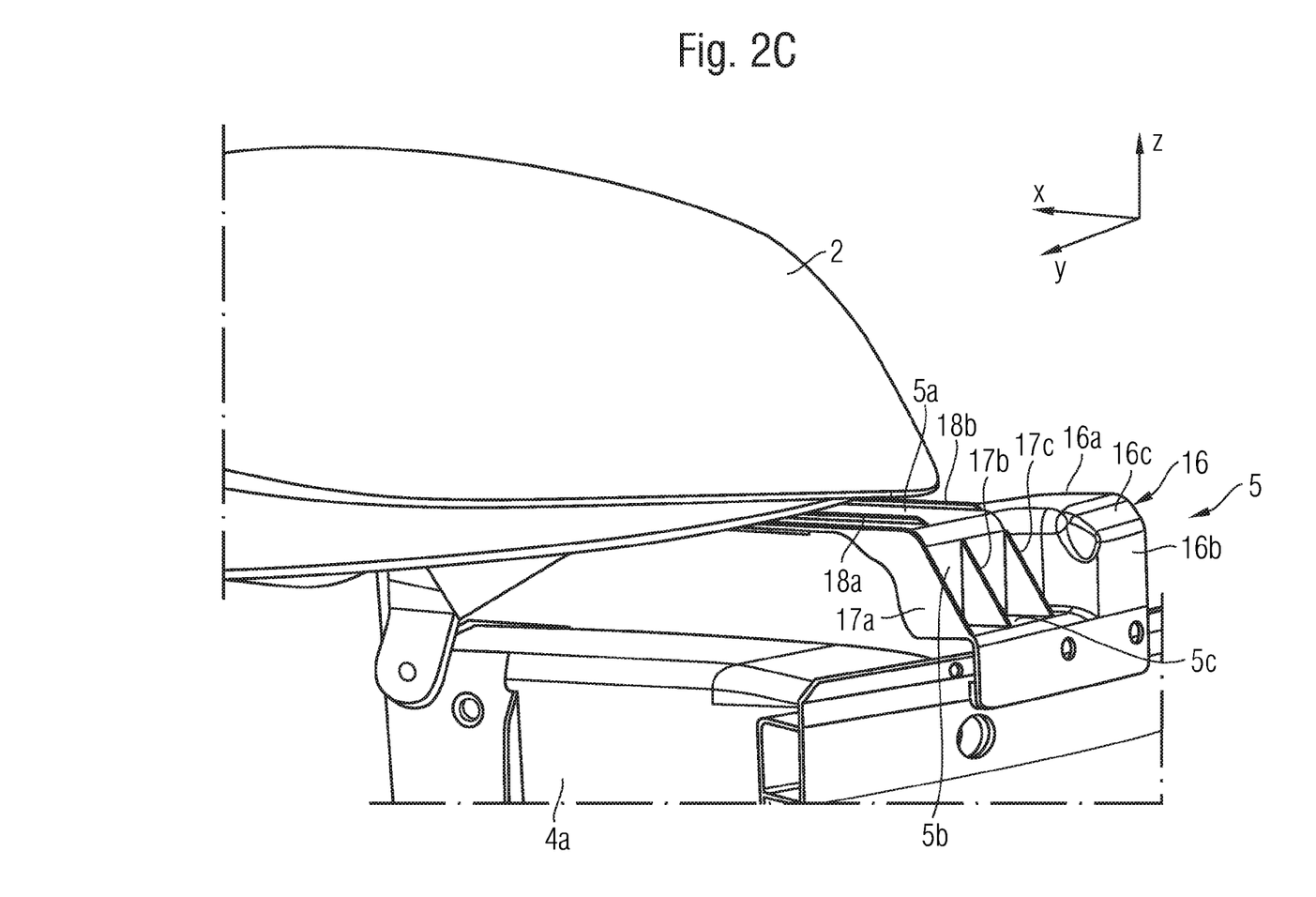
FIG. 2c shows a perspective view of the bumper arrangement from FIG. 2b.

FIG. 2c shows a perspective view of a bumper arrangement from FIG. 2b. Unlike the first exemplary embodiment, the device 5 has an elbow 16, which increases the rigidity of the device 5. Two legs of the elbow 16a, 16b have a bevel 16c at their connecting point.

Furthermore, the sections 5a, 5b, 5c are provided with reinforcing ribs 17a, 17b, 17c which increase the rigidity of the device 5, in particular in the Z direction z.

The first section 5a of the device 5 is configured as a plug element 24 and has webs 18a, 18b in the X direction x. The webs 18a, 18b engage in corresponding grooves (not shown) in a linear guide 19 (shown in FIG. 2d), which are attached to the headlamp housing 2, in particular are formed thereon in one piece. Any movement of the headlamp housing in the Y direction y is thereby prevented.

Figure 2D:
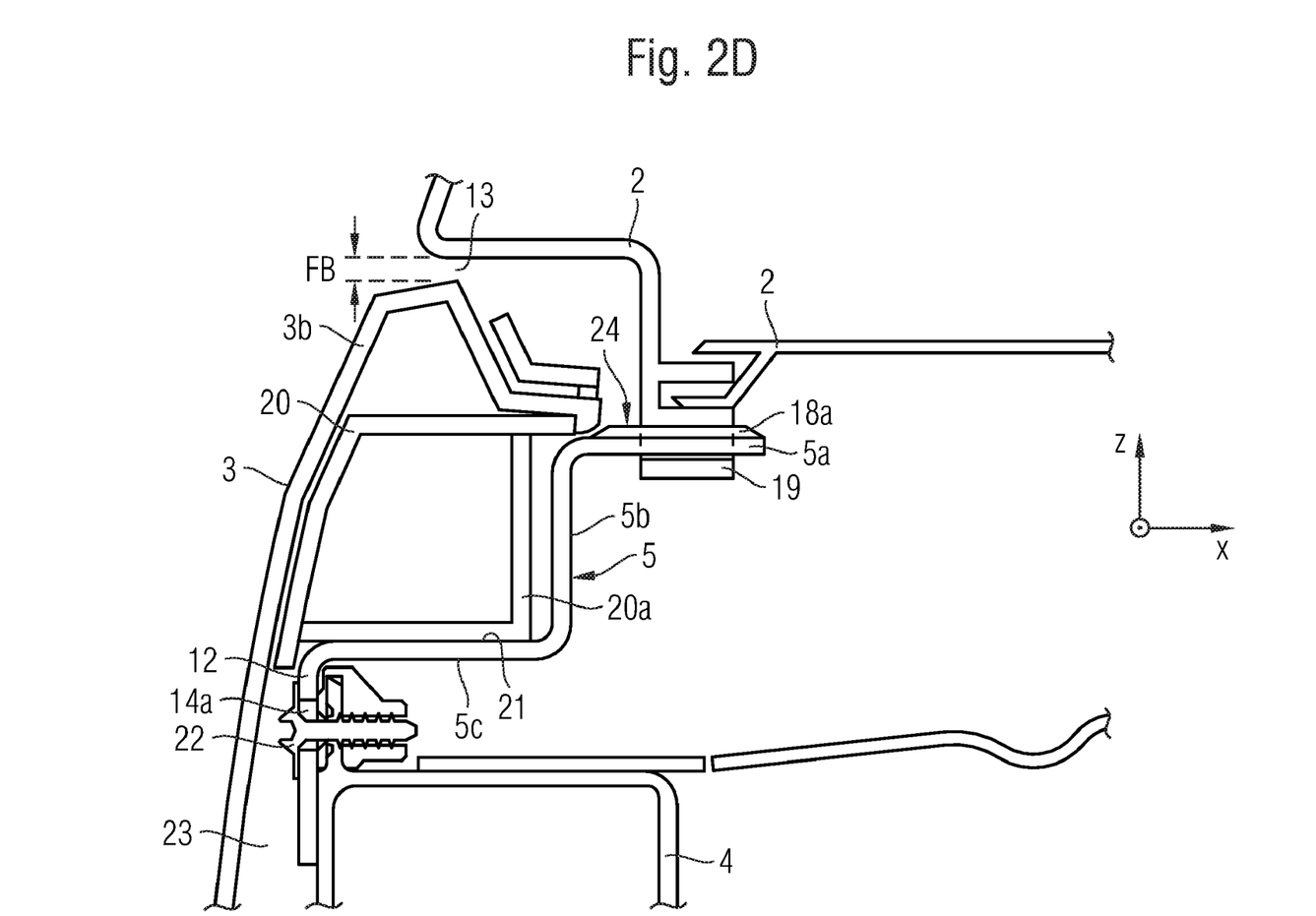

FIG. 2d shows a section from FIG. 2b in the X-Z plane through the bumper arrangement 1. An initial position is shown in FIG. 2d.

The bumper 3 has a join 13 to the headlamp housing 2 having a seam width FB. A reinforcing part 20 is fastened to the bumper 3, in particular is clipped-in. The reinforcing part 20 has an angular-shaped cross section 20a, which engages in a projection 21 of the device 5. The projection is in this case formed by the step-shaped arrangement of the sections 5a, 5b, 5c of the device 5.

The device 5 is screwed to the bumper bracket 4 by means of screws 22, which are inserted through the holes 14a, 14b. A foam mass 23 is inserted between the bumper 3 and the bumper bracket 4 for absorption of impact energy.

The device is inserted into the linear guide 19 on its section 5a configured as plug element 24. In the event of a collision, the foam mass 23 initially absorbs some of the collision energy. An upper region 3b of the bumper 3 then vibrates in the X direction. At the same time, the reinforcing part 20 acts on the second and/or third section 5b, 5c of the device. The device 5 thereby deforms and/or is released from its fastening on its fastening section 12 by the bumper bracket. In particular, the screw 22 can be designed as a predetermined breaking point. The deformation of the device 5 and/or the release of the device 5 effects a displacement of the plug element 24 in the X direction x in the linear guide 19.

Once the impact has passed, the bumper 3 vibrates back into the initial position shown in FIG. 2. In the event that the device 5 has merely become elastically deformed by the impact, the seam width after the impact corresponds to the seam width FB in the initial position.

Any damage to the headlamp housing 2 can thus be effectively prevented. Furthermore, a join 13 having a constant seam width is ensured by means of the device 5 according to the invention.

Headlamp housing is also to be understood in the entire application as a headlamp cover disc and/or a headlamp.

The invention is not restricted to the special structure of a bumper arrangement for or in a vehicle shown in the preceding figures or to a vehicle having the bumper arrangement according to the invention.

For example, the present inventive idea is also applicable to other cladding parts and/or housing, for example, for a trim or a flasher housing of a vehicle.

Furthermore, the geometry of the bumper arrangement according to the invention can be modified in manifold ways. For example, the device can have an S-shaped or another angular structure.

Furthermore, in a further development of the bumper arrangement according to the invention, a plurality of such devices can be used.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A bumper arrangement in a motor vehicle, comprising:
   a bumper;
   a headlamp housing disposed at least partially in the bumper;
   a device for positioning the headlamp housing relative to the bumper along a z axis (z), the device comprising:
   a first receiving apparatus, at which the bumper is attached;

a first engagement apparatus, which is firmly connected to the first receiving apparatus, wherein the first engagement apparatus is displaceably in engagement with the headlamp housing along an x axis (x), wherein the first engagement apparatus has a fixed distance (FB) to the first receiving apparatus along the z axis (z) substantially perpendicularly to the x axis (x), wherein the x axis (x) is disposed in a longitudinal direction of the motor vehicle and the z axis (z) is disposed in a height direction of the motor vehicle, and wherein the bumper has a second engagement apparatus, which is in engagement with the first receiving apparatus of the device, and that preferably a reinforcing part is provided, which is attached to the bumper and which comprises the second engagement apparatus, and that further preferably the second engagement apparatus has at least one of a hook-shaped cross-section or angle-shaped cross-section.

2. The bumper arrangement according to claim 1, wherein the bumper arrangement comprises a bumper bracket, which carries the bumper, wherein the device is fastened to the bumper bracket.

3. The bumper arrangement according to claim 1, wherein the first receiving apparatus is configured as a projection for suspending the second engagement apparatus.

4. The bumper arrangement according to claim 1, wherein the first engagement apparatus of the device is configured as a plug element.

5. The bumper arrangement according to claim 1, wherein the headlamp housing has a second receiving apparatus, which is in engagement with the first engagement apparatus, and the second receiving apparatus of the headlamp housing is configured as a linear guide, in which the first engagement apparatus is displaceably inserted, and the linear guide is substantially aligned in the longitudinal direction of the motor vehicle (x).

6. The bumper arrangement according to claim 1, wherein the device contains a reinforced plastic material.

7. A bumper arrangement in a motor vehicle, comprising:
a bumper;
a headlamp housing disposed at least partially in the bumper;
a device for positioning the headlamp housing relative to the bumper along a z axis (z), the device comprising:
a first receiving apparatus, at which the bumper is attached;
a first engagement apparatus, which is firmly connected to the first receiving apparatus,
wherein the first engagement apparatus is displaceably in engagement with the headlamp housing along an x axis (x), wherein the first engagement apparatus has a fixed distance (FB) to the first receiving apparatus along the z axis (z) substantially perpendicularly to the x axis (x), wherein the x axis (x) is disposed in a longitudinal direction of the motor vehicle and the z axis (z) is disposed in a height direction of the motor vehicle, and wherein the device has a first cross-section in an x-z plane with a first section, a second section, and a third section, wherein the second section is disposed between the first second and the third section, wherein the second section connects the first section and the third section, wherein the first section and the third section are offset in opposite directions from the second section, and the first section has the first engagement apparatus and the third section has the first receiving apparatus and a fastening section, at which the device is fastened on a bumper bracket, and at least one of the first section, the second section, or the third section has at least one reinforcing rib.

8. A motor vehicle, comprising:
a bodywork;
a bumper;
a headlamp housing at least partially disposed in the bumper, which is firmly connected to the bodywork;
a device for positioning the headlamp housing relative to the bumper along a z axis (z), the device comprising:
a first receiving apparatus at which the bumper is attached; and
a first engagement apparatus, which is firmly connected to the first receiving apparatus,
wherein the first engagement apparatus is displaceably in engagement with the headlamp housing along an x axis, wherein the x axis (x) is disposed in a longitudinal direction of the motor vehicle and the z axis (z) is disposed in a height direction of the motor vehicle, wherein the first engagement apparatus has a fixed distance (FB) to the first receiving apparatus along the z axis (z) substantially perpendicularly to the x axis (x), wherein the bumper has a second engagement apparatus, which is in engagement with the first receiving apparatus of the device, and wherein the device has a first cross-section in an x-z plane with a first section, a second section, and a third section, wherein the second section is disposed between the first second and the third section, wherein the second section connects the first section and the third section, wherein the first section and the third section are offset in opposite directions from the second section, and wherein the first section has the first engagement apparatus and the third section has the first receiving apparatus.

* * * * *